United States Patent [19]

Gambrill et al.

[11] Patent Number: 5,368,390
[45] Date of Patent: Nov. 29, 1994

[54] MIXER SYSTEMS

[75] Inventors: Jeffrey S. Gambrill, Hilton; William F. Hutchings, Fairport; Stephen L. Markle; Marlin Schutte, both of Rochester; John M. Palmer, Groveland, all of N.Y.

[73] Assignee: General Signal Corporation, Rochester, N.Y.

[21] Appl. No.: 24,715

[22] Filed: Mar. 1, 1993

[51] Int. Cl.$^5$ ............................................. B01F 13/08
[52] U.S. Cl. ....................................... 366/273; 366/331
[58] Field of Search ................... 277/9; 366/65, 96–98, 366/241, 242, 244, 245, 247, 249, 250–252, 254, 261, 272, 273, 279, 331, 343; 389/492, 907.1, 913

[56] References Cited

U.S. PATENT DOCUMENTS

| | | |
|---|---|---|
| 2,300,385 | 10/1942 | Kollberg . |
| 2,556,854 | 6/1951 | Spears . |
| 3,304,449 | 2/1967 | Pohlman ........................ 366/273 |
| 3,606,260 | 9/1971 | Rubin . |
| 3,642,291 | 2/1972 | Zeffer . |
| 3,695,586 | 10/1972 | Griffin .......................... 366/279 |
| 4,184,090 | 1/1980 | Taiani . |
| 4,209,259 | 6/1980 | Rains . |
| 4,289,317 | 9/1981 | Kuc ................................... 277/9 |
| 4,565,453 | 1/1986 | Jekat . |
| 4,721,003 | 1/1988 | Hutching . |
| 4,752,194 | 6/1988 | Wienen . |
| 4,775,291 | 10/1988 | Culbertson . |
| 4,813,786 | 3/1989 | LeMaster ........................ 366/251 |
| 4,854,823 | 8/1989 | Hatting . |
| 4,878,677 | 11/1989 | Larkins . |
| 4,882,062 | 11/1989 | Moeller .......................... 366/273 |
| 4,884,245 | 11/1989 | McIntosh ........................ 366/250 |
| 4,973,172 | 11/1990 | Nisley ............................. 384/492 |
| 4,998,863 | 3/1991 | Klaus . |
| 5,017,102 | 5/1991 | Shimaguchi . |
| 5,066,200 | 11/1991 | Ooka . |
| 5,094,542 | 3/1992 | Engel . |
| 5,108,715 | 4/1992 | Jakat . |
| 5,112,146 | 5/1992 | Stangeland ..................... 384/492 |
| 5,139,396 | 4/1992 | Suzuki ............................ 384/492 |

FOREIGN PATENT DOCUMENTS

| | | | |
|---|---|---|---|
| 667874 | 7/1963 | Canada ..................... 366/98 |
| 679831 | 2/1964 | Canada ..................... 366/250 |
| 125240 | 7/1985 | Japan ....................... 366/273 |
| 4004311 | 1/1992 | Japan ....................... 384/492 |
| 808114 | 2/1981 | U.S.S.R. .................... 266/273 |

Primary Examiner—David A. Scherbel
Assistant Examiner—Torrence R. Till
Attorney, Agent, or Firm—M. Lukacher

[57] ABSTRACT

A mixer system for aggressive (toxic, hazardous, corrosive, etc.) materials which are mixed (agitated, suspended, circulated, etc.) in a tank with an impeller connected to a drive shaft has the impeller and its shaft mounted in an assembly which extends through an opening into the tank and closes that opening. The assembly has a cylindrical hub with a passageway through which the shaft extends out of an open end of the hub. Bearings which are made of materials which are resistant to the aggressive material in the tank are mounted in the hub and journal and support the shaft. There are no dynamic seals which close the confinement region so that the aggressive materials can be present therein. In the event that it is desirable that the bearings be replaceable or the confinement region be sterilized, or purged, an expandable elastomeric collar may be disposed either at the end of the hub below the bearings, which may then be mounted in a cartridge in a hub which is removable therefrom, or in a plate spaced from the hub. Purge or pressure release passages may be provided which are opened and through which purging or sterilizing gas is introduced into the confinement region.

22 Claims, 8 Drawing Sheets

MIXER SYSTEMS

DESCRIPTION

The present invention relates to mixer systems, by which is meant systems for suspending, agitating and/or circulating materials, particularly liquids or liquid suspensions and particularly to mixer systems for mixing aggressive materials, by which is meant toxic, hazardous, corrosive or other materials which need to be confined for proper handling, processing or for environmental safety or health reasons.

In order to prevent the escape of aggressive materials from the vessel in which they are mixed, confinement of the mixing apparatus which contacts the material has necessitated the use of magnet couplings which provide confinement shells or members or which use the wall of the vessel to separate the driven impeller apparatus from the motor and other drive elements. The spacing of the impeller and other parts of its drive apparatus, for example the impeller shaft, as well as the rotor of the magnet coupling with respect to the confinement shell or member or the other separating member (the wall of the tank) has necessitated the use of bearings which control the run out of the shaft and the impeller so that there is no interference with the confinement shell. The conventional approach has been to protect the bearings and to provide dynamic, running seals which prevent the aggressive materials from leaking into regions where the bearings are located. Such seals are undesirable since they have limited lifetimes and must be replaced before failure. The life of the seals is also subject to reduction because they are exposed to the aggressive material.

It is a feature of this invention to eliminate such seals thereby effectively providing a sealless mixer system. Instead of resorting to seals, the bearings themselves are made, or at least surfaced, with material resistant to the aggressive material being mixed. The invention, contrary to the conventional technology, uses bearings or journals for the impeller shaft which are confined with the aggressive material. Notwithstanding, the conventional technology, it has been found in accordance with the invention that mixer systems having acceptable lifetimes, in spite of their use with aggressive materials, are not only possible but practicable.

It is necessary in accordance with certain processing techniques, for example when the aggressive material is altered from one type of material to another or has different ingredients thereto and proportions are critical or the presence of materials previously being mixed is detrimental to the process, that all or part of the region which is confined be purged or even sterilized. In order to accommodate such needs, and in other applications where it is desirable to remove or replace the bearings and other parts which are in confinement, a static seal can be provided at a desired location and used when the impeller shaft is stopped to isolate all or part of the region under confinement, for example the part containing the rotor and inside of the containment shell of the magnetic coupling or even the aforementioned part including the bearings. It is a feature of the invention to provide in the improved sealless mixer system an expandable collar which defines a seal against the shaft thereby isolating all or part of the region under confinement and enabling it to be purged, say with nitrogen gas or even sterilized, as when the purging agent is steam. When the expanding collar is in sealing relationship with the shaft, the shaft is stopped. During normal running conditions the collar does not interfere with the shaft and the sealless condition prevails.

The material which is subject to mixing may be under pressure and the vessel in which it is located is pressurized. This pressure may be used in accordance with the feature of the invention to provide a secondary or back up static seal in addition to the seal provided by the expandable collar. Then a flange on the shaft and a collar confines a seal member (e.g., a O ring) between their opposed surfaces. The shaft may be biased to separate the opposed surfaces so that under dynamic conditions when the shaft is rotating no seal is formed between the opposed surfaces. When the pressure is relieved, however, the bias is counteracted by the pressure in the tank to enable the seal to be formed between the opposed surfaces thereby providing even further assurance that the aggressive material will not escape from the vessel.

It is desirable for certain mixing applications that the impeller rotate at lower speed and provide higher torque than the motor which drives the impeller. The magnet coupling has limited torque transfer capacity. Accordingly, mixing systems with magnetic couplings have been limited in the amount of torque and mixing power which can be delivered to the material being processed. It is a feature of this invention to provide a gear train in the confined region between the impeller shaft and the inside or inner rotor of the magnet coupling. Preferably the gear train is provided by a planetary gear set thereby enabling the torque to be multiplied in a volume which is available in the confined region.

It is the principal object of the present invention to provide improved mixing apparatus, and particularly an improved mixer system which is adapted to be used for mixing aggressive materials.

A more specific object of the present invention is to provide an improved mixer system having one or more of the features discussed above.

Briefly described, a mixer system embodying the invention is applicable for mixing aggressive material in a vessel having an opening. A drive shaft for rotatably supporting a mixing impeller is used. The drive shaft is rotatably supported in bearings contained in an assembly which is located in the opening and closes the opening to confine the aggressive material in the vessel. The assembly has an open passageway in which the bearings and shaft are disposed. Since the passageway is open, the mixer system is sealless. The passageway connects the bearings and the vessel in communicating relationship for the aggressive material. There are no dynamic seals in the passageway. The bearings have at least the surfaces thereof which are exposed to the aggressive material made of a material resistant to the aggressive material. If desired, an expandable collar may be used to provide a static seal when the drive shaft is stopped. Passageways may be provided for releasing the pressure behind the expanded collar in order to purge or sterilize the parts of the assembly in confinement. For example the bearings may be mounted in a cartridge which is removably disposed in the assembly. If torque multiplication is desired, the drive shaft may be connected via a gear train also in confinement. This gear train may be driven at higher speed and lower torque than desired to power the impeller through a magnet coupling; the gear train being connected to the inside part of the coupling.

The term inner rotor should be taken to mean the inside part of such a magnet coupling.

The foregoing and other objects, features and advantages of the invention, as well as presently preferred embodiments thereof will become more apparent from a reading of the following description in connection with the accompanying drawings in which.

Figure 7:
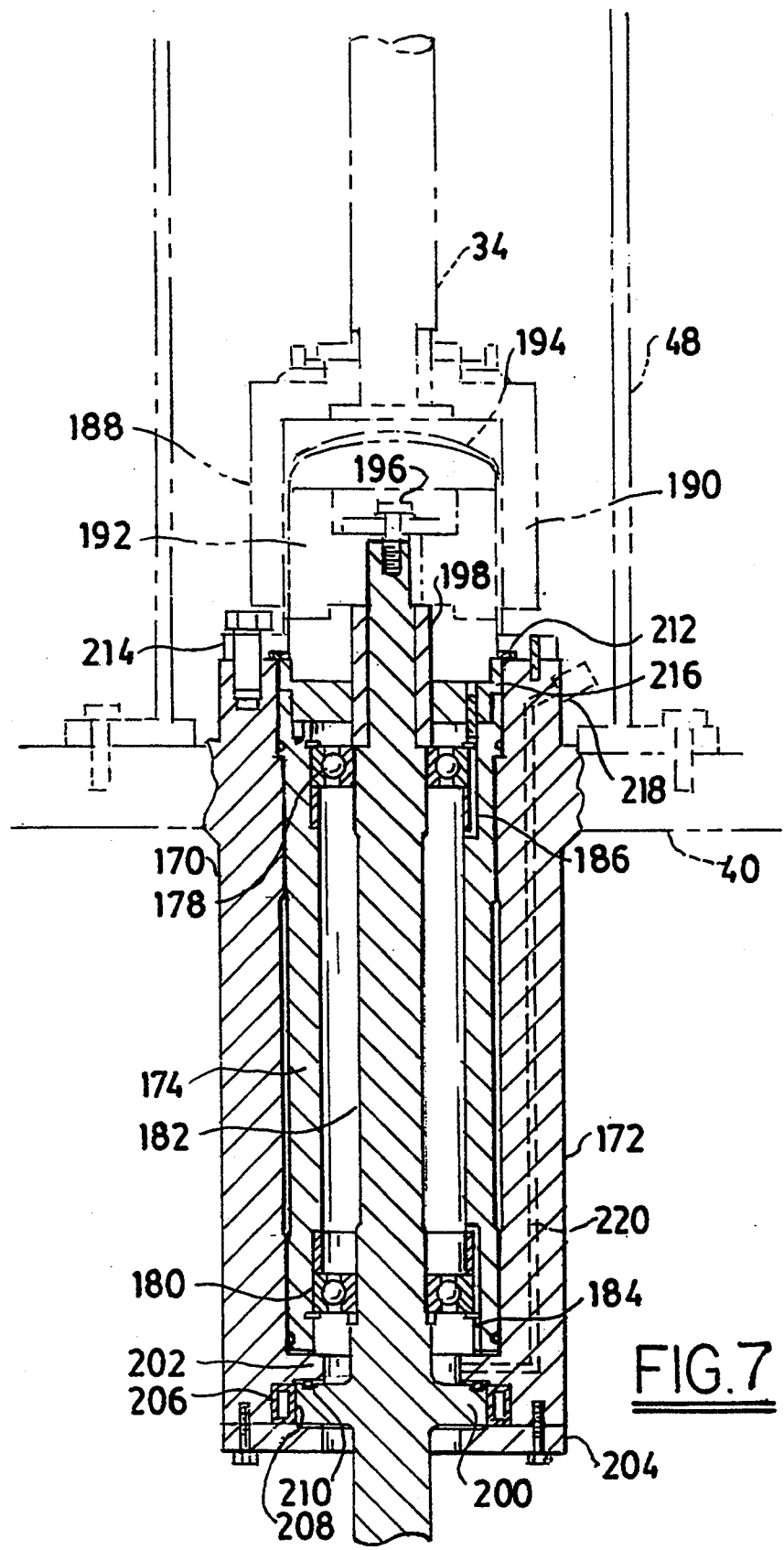
FIG. 7 is a view similar to FIG. 6 which also shows the flange and pedestal and outer rotor drive but is in accordance with still another embodiment of the invention.
Figure 8:
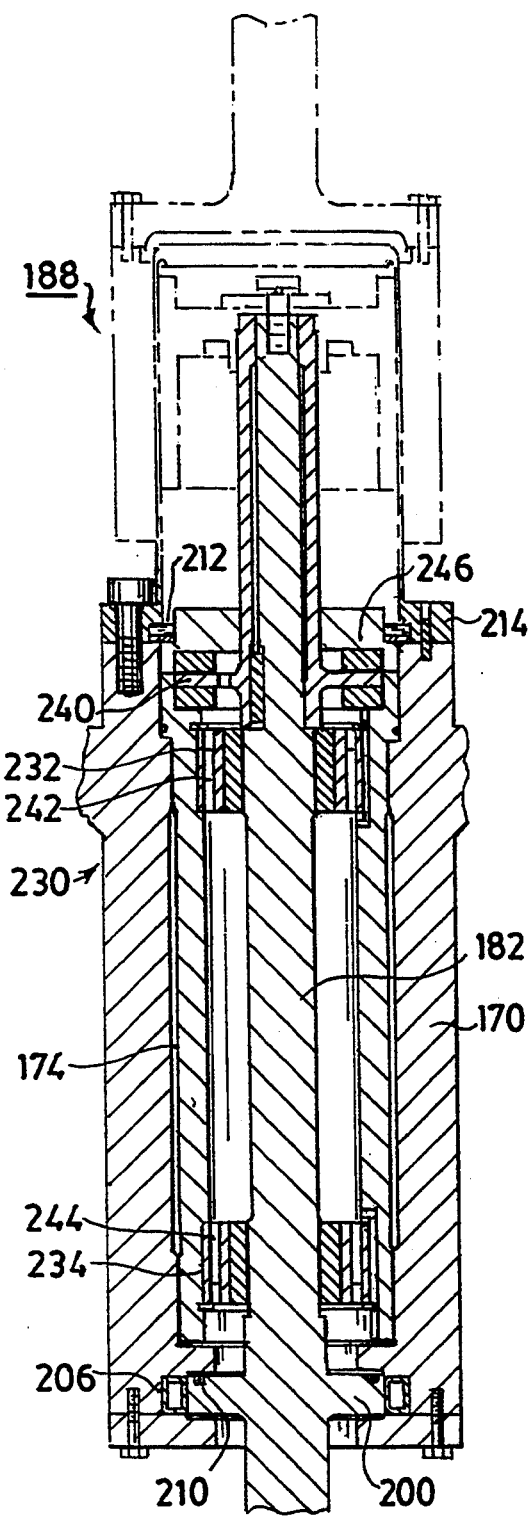
Figure 9:
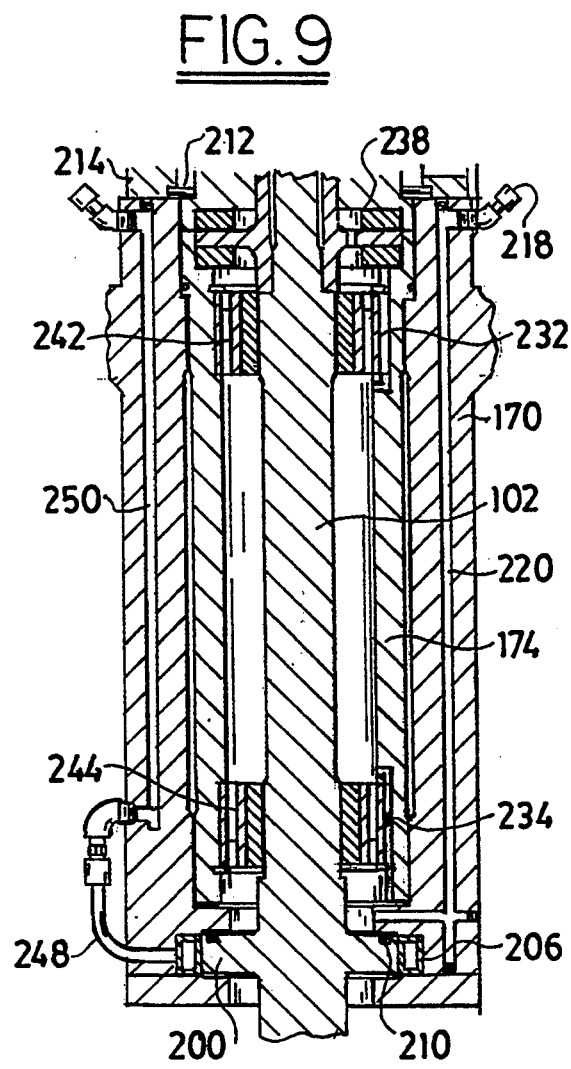
Figure 10:
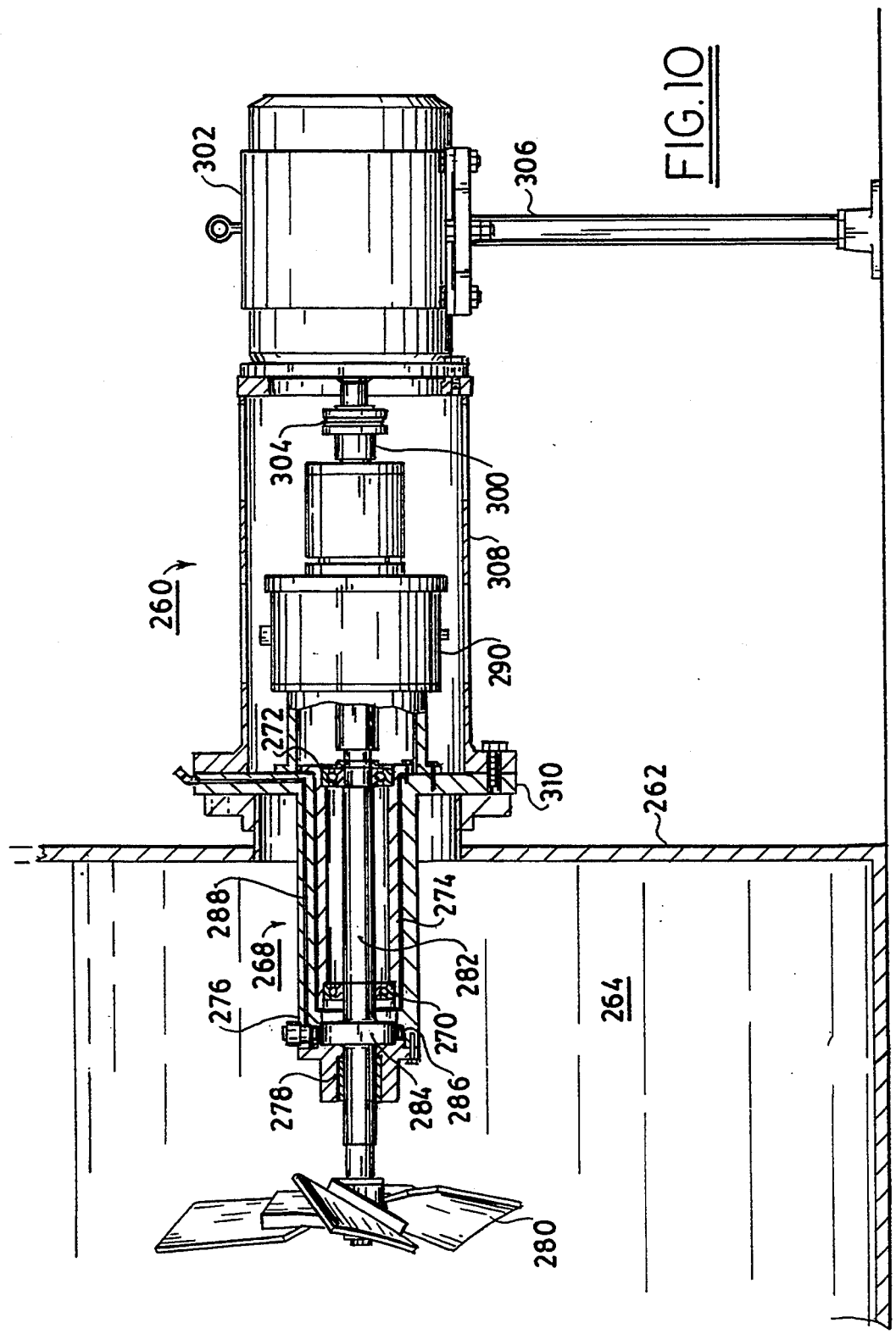
Figure 11:
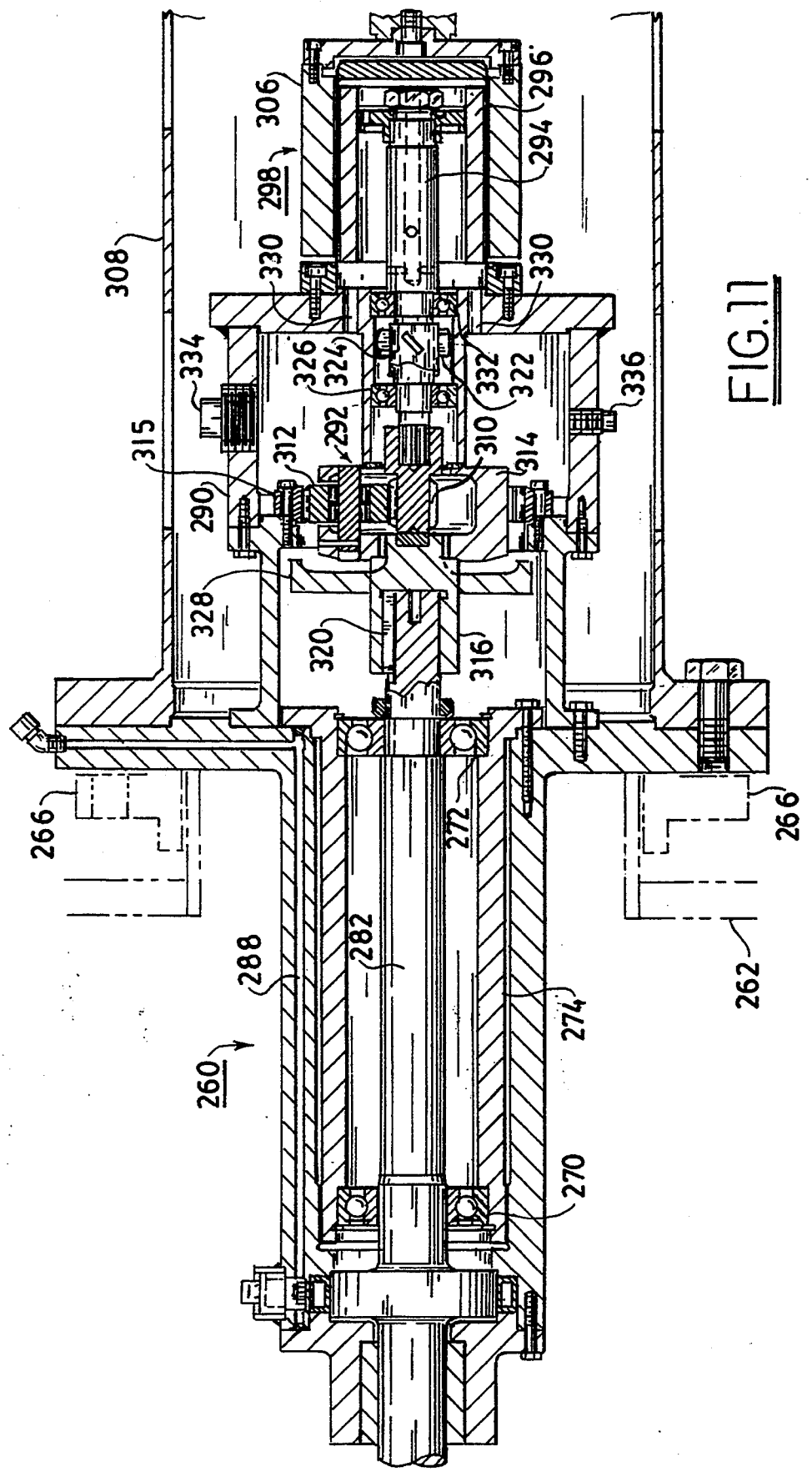

FIGS. 8 and 9 are respectively a view similar to FIG. 7, and an elevational sectional view 90° about the axis of the impeller drive shaft from the view shown in FIG. 8, both views showing a mixer system in accordance with still another embodiment of the invention; and FIGS. 10 and 11 are elevational views illustrating a mixer system which enters the vessel or tank from the side (side entry) and which utilizes a planetary gear set, all in accordance with still another embodiment of the invention.

Figure 1:
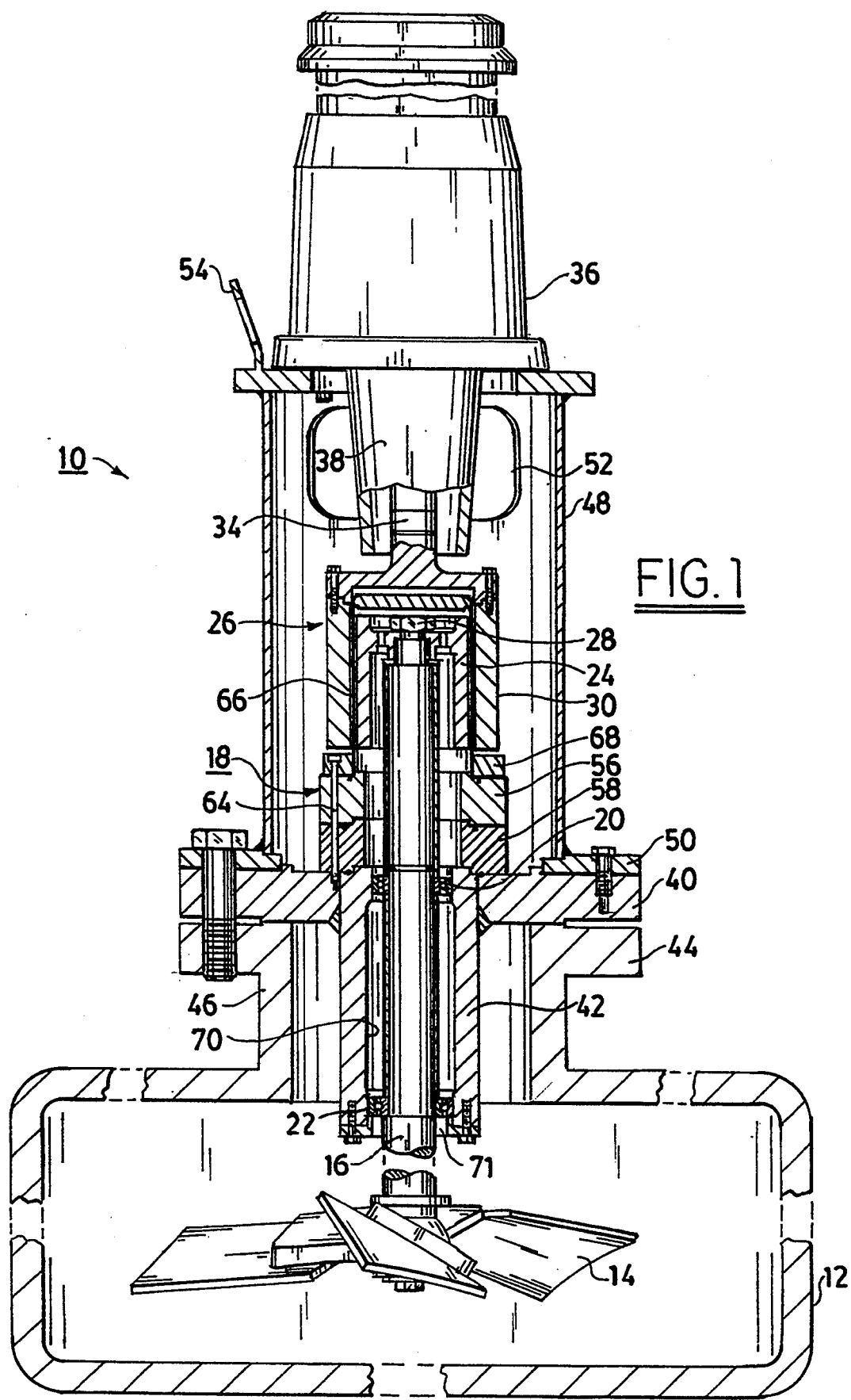
FIG. 1 is a elevational view, partially in section, of a mixer system embodying the invention.
Figure 2:
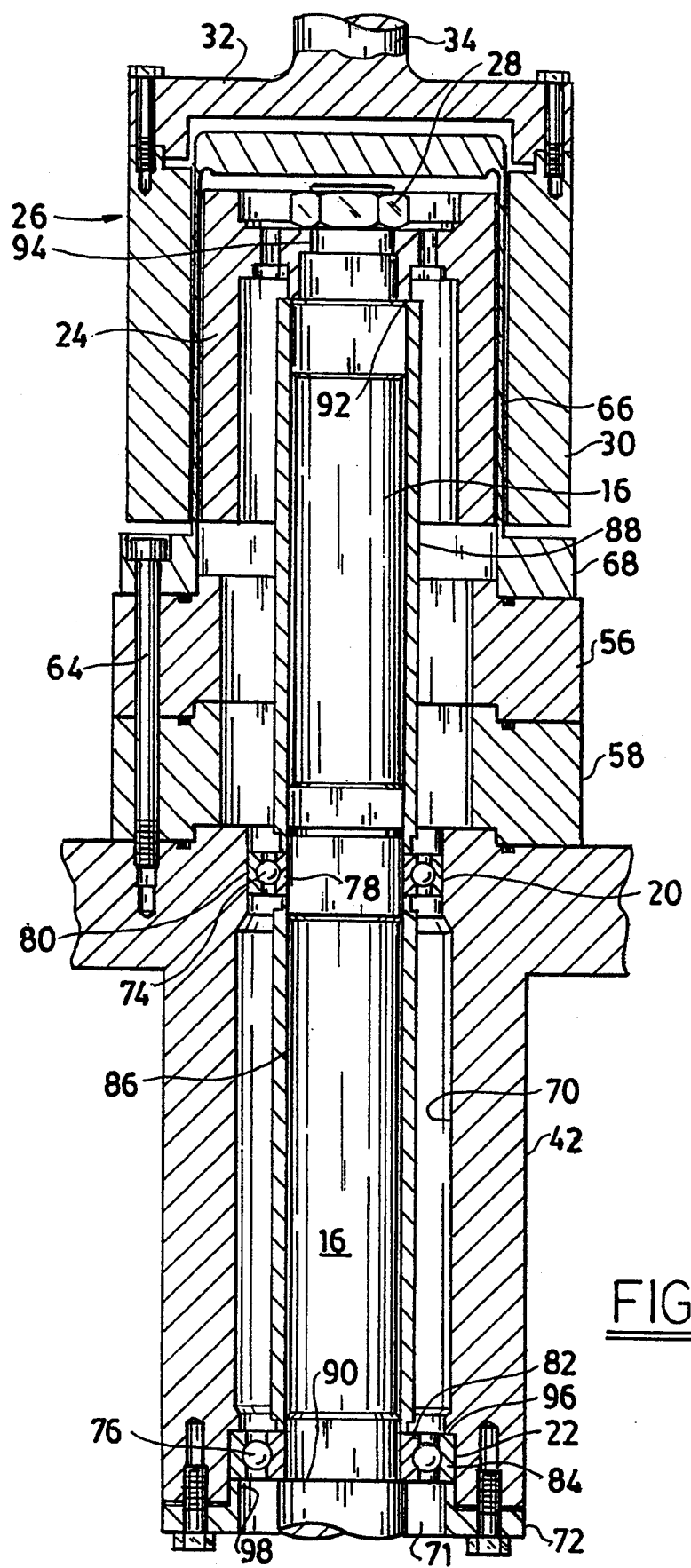
FIG. 2 is an enlarged fragmentary elevational view of the region of the mixer system of FIG. 1 which is in confinement and connected through a sealless open end thereof to the mixing tank.

Referring to FIGS. 1 and 2, there is shown a top entry sealless mixer system 10 which embodies the invention. Aggressive material to be mixed is introduced into a vessel 12 having its inside walls coated or made with material which is resistant to the aggressive characteristics of the material. An impeller 14 is located in the vessel 12 and is connected to a drive shaft 16. An assembly 18 has upper and lower bearings 20 and 22 which rotatably support the shaft and also rotatably support an inner rotor 24 of a magnet coupling 26. This support is provided by a cap nut 28 or bolt which is eccentrically disposed on the shaft 16 as shown in greater detail in FIG. 2, for torque transmission (acting like a cam) between the inner rotor 24 and the shaft 16.

The outer rotor 30 of the coupling 26 is connected via the flanged end 32 of a shaft 34 which extends from a motor gear-box assembly 36. The motor gear-box assembly is mounted on a bearing support 38 which journals the shaft 34. The magnet coupling 26 has circumferentially disposed arrays of permanent magnets in its inner and outer rotors 24 and 30. The magnets in the inner rotor 28 are aligned with the magnets in the outer rotor 30 but are polarized oppositely (i.e., north-south, south-north, north-south, south-north, etc.). The design of the coupling 26 may be conventional and it may be of the type which is commercially available. The assembly 18 has a flange 40 which may be welded to a hub 42 or may be one piece as shown in FIG. 2. The flange is bolted to a flange 44 of the nozzle 46 of the vessel 12 and closes the opening into the vessel with the assembly 18. The motor 36 and its bearings support 38 are mounted on the top of a pedestal 48 which has a lower end flange 50 which is bolted to the flange 40. Openings 52 in the pedestal 48 provide access to the internals of the mixer system (the bearing support 38, the outer rotor 30 and the assembly 18). Ears 54 allow the mixer apparatus 10 to be lifted and transported. The ears are 120 degrees apart; thus only one ear appears in FIG. 1.

The assembly 18 also includes spacer plates 56 and 58 which are interchangeable with static seal plates 60 and purge plates 62, as are shown and will be described in greater detail hereinafter in connection with FIGS. 3 and 5. These plates 56 and 58, either when used alone or in different arrangements with the plates 60 and 62, are bolted together by a circumferentially disposed array of bolts 64 to the flange 40. The magnet coupling has a confinement shell (also known as a separator or separating member) 66 having flange 68 which is bolted in the assembly by the bolts 64. The shell 66 may also be called a containment shell.

The cylindrical hub 42 has an internal bore or passageway 70 which defines a passageway through which the shaft 16 extends and in which the bearings 20 and 22 are located. This passageway 70 is opened to the vessel 12 and therefore to the aggressive material confined therein which, especially if the vessel is pressurized and the material can vaporize, is present in the passage 70. The passage 70 is part of a confinement region which includes cylindrical bores in the plates 56 and 58 and the inside of the confinement shell 66. The hub is terminated at its open end by an end cap 72 but is otherwise open and sealless.

The bearings 20 and 22 are bearings having rolling elements, namely balls 74 and 76 and inner and outer races 78 and 80 for the bearing 20 and 82 and 84 for the bearing 22. The bearings are axially spaced from each other, with the bearing 82 closer to the open end 71 of the passageway 70 and the bearing 20 further from the open end 71, by spacer sleeves 86 and 88. The shaft 16 has a shoulder 90 which references the inner race 82. The inner race and the bearing 22 is fixed in axial position by the spacer sleeve 86 which sandwiches the inner race 78 of the bearing 20 and is compressed against that inner race by force applied from the bolt or nut 28 against the upper end of the spacer sleeve 88 via a shoulder 92 which extends downwardly from the hub 94 of the inner rotor 24. The outer race 84 is fixed between a step 96 around the bore 70 and a shoulder 98 of the end cap 72. The outer race 80 floats axially in the bore to take up thermal expansion and tolerances in manufacture.

The balls 74 and 76 of the ball bearings and the races thereof are all exposed to the aggressive material. The surfaces which are exposed are made of material resistant to the aggressive material. Desirably the balls are made of entirely such material so that their surfaces are resistant. The balls may be a ceramic, for example silicon nitride. An alternative material which may be suitable for other applications is stellite. Stellite is a boron containing alloy. It has been found that stellite, sold under the tradename Hanes 25 is suitable. (The races may be stellite of Rockwell C hardness of about 60). For some applications, steel races having a zirconium/zirconium nitride vapor deposition or sputtered coating may be used. For other applications the races may be plated with thin dense chromium, for example a 0.3 mil coating of chromium. Other types of coatings may be applied by vapor deposition or sputtering. The thin dense chromium material is sold under the tradename Armalloy. Other materials which are resistant or more preferably inert to the aggressive material being mixed may be used.

Figure 3:
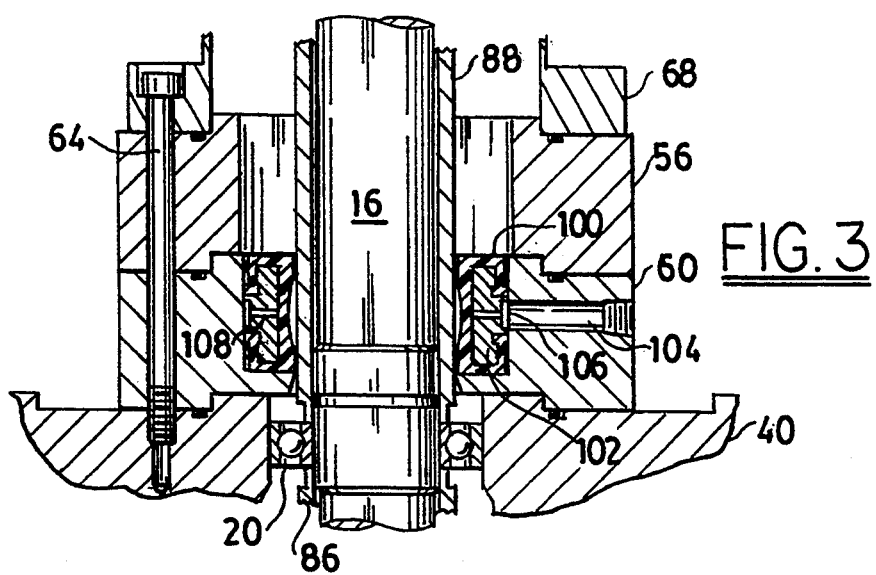
FIGS. 3, 4 and 5 are similar enlarged fragmentary elevational views showing different arrangements of separator plates which may alternatively be used in the assembly shown in FIGS. 1 and 2 to provide static sealing and purging or sterilizing capabilities.
Figure 5:
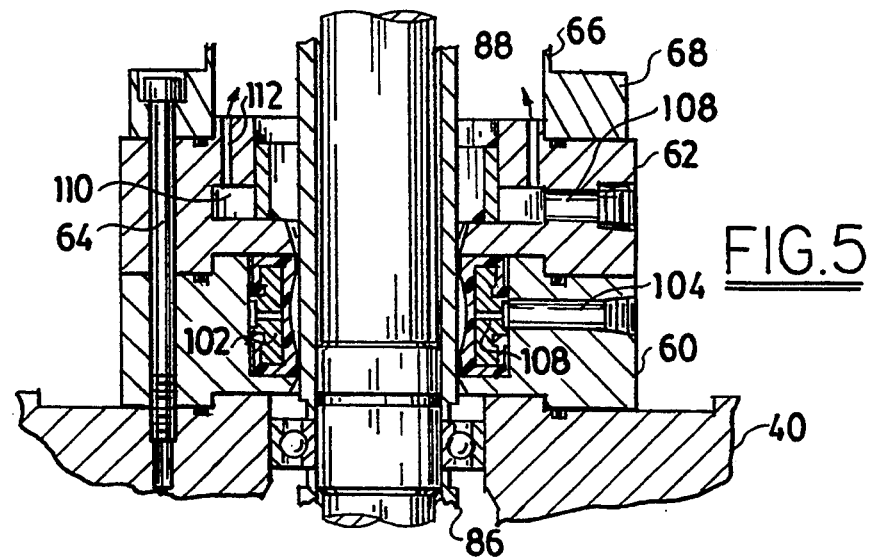

FIGS. 3 and 5 illustrate a static seal which may be provided by a pneumatically pressurized collar 100 of elastomeric material, for example, such as viton, a elastomeric polymer. The collar is a hollow annulus on a ring shaped metal core 102. Such expandable seals are commercially available. Pressurized air is introduced through a port 104 into a ring 106 which communicates with the front end of the core through holes 108. Normally the collar does not interfere with the shaft nor contact the sleeve 88. The collar is expanded only when the motor and the shaft 16 are stopped. Then access may be had to the magnet coupling. A normally plugged opening may be provided in the purge ring of plate 56 to relieve the pressure between the expandable collar and the confinement shell. By locating the collar 100 above the hub and above the bearings 20 and 22, the bearings and the passageway 70 remain exposed to the aggressive material.

As shown in FIG. 5 the purge plate 62 has a port 108, an annular manifold 110 and a plurality of circumferentially disposed openings 112. The purge plate may have the port 108 plugged and then opened to relieve the pressure behind the expanded collar 102. Alternatively, inert gas, such as nitrogen or sterilizing vapors, such as steam, may be introduced through the port 108, the manifold 110 and the openings 112 to purge and/or sterilize the confinement region above the collar 102.

Figure 4:
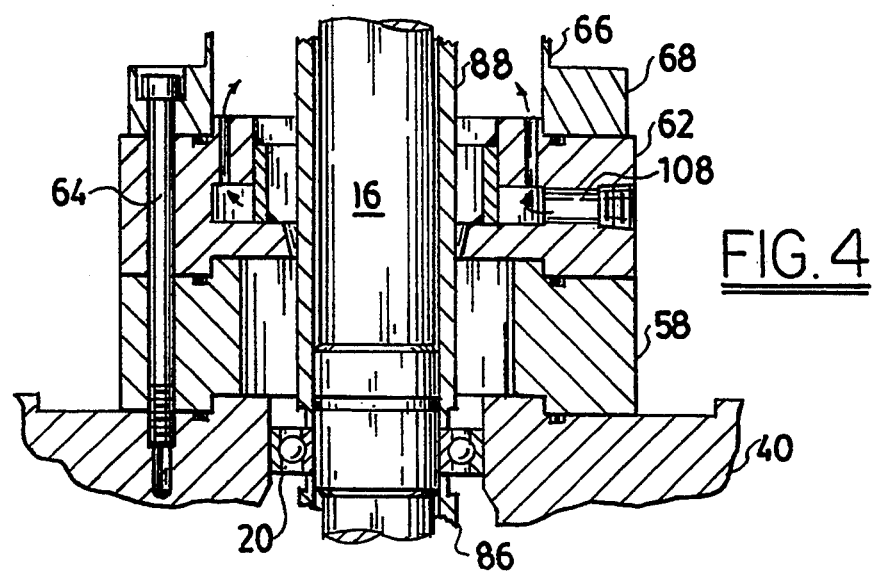

In the event that purging into the vessel 12 is desired only the ring plate 58 is used together with the purge plate 62 as shown in FIG. 4. Then the vessel 12 as well as the passageway and the entire confinement region can be purged and/or sterilized. The exhaust from the vessel may be by suction applied to the port 108 of the purge plate 62 or via an opening (e.g., the fill opening) in the tank or vessel 12.

Figure 6:
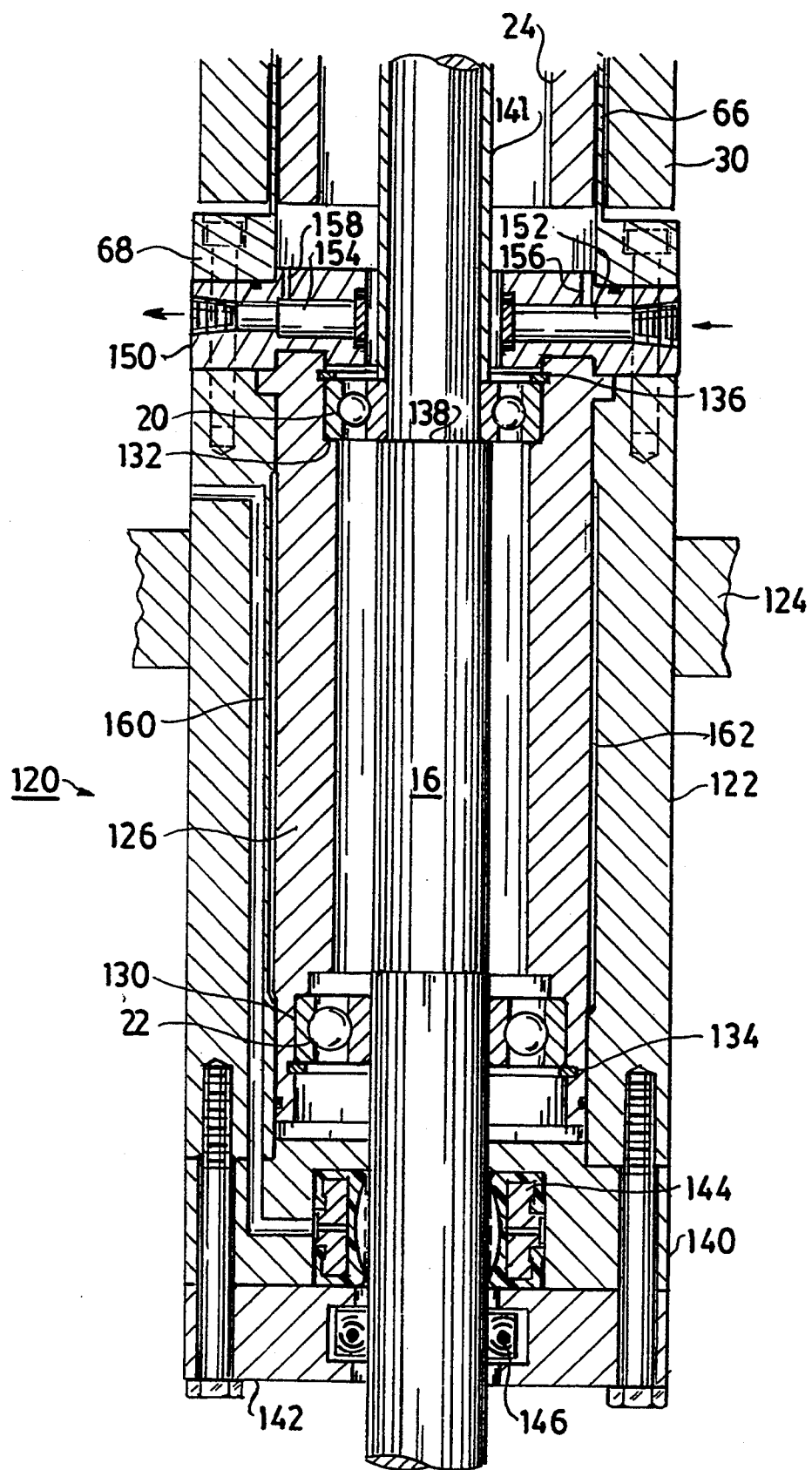
FIG. 6 is fragmentary elevational view similar to FIG. 2 showing the portion of the assembly which provides the confined region of the mixer system, but in accordance with another embodiment of the invention.

Referring to FIG. 6 there is shown an assembly 120 using a hub 122 and flange 124 connectable to an opening (nozzle) of a tank, such as shown in FIG. 1, for closing that opening. The hub 122 receives the bearings 20 and 22 in a cartridge 126. The cartridge is a cylindrical tube having steps 130 and 132 against which the outer races of the bearings 20 and 22 are referenced and held in place by snap rings 134 and 136. The upper bearing 20 is fixed since its inner race is referenced against a step 138 on the shaft and held against that step 138 by a tubular sleeve 141 which may be compressed by the hub shoulder of the inner rotor as discussed in connection with FIGS. 1 and 2. The inner race of the lower bearing 22 is allowed to float. The bearings 20 and 22 may be made of materials similar to those discussed above.

Below the bearings, in a ring plate 140 which is sandwiched against the bottom end of the hub 122 by a grooved end cap 142, is an expandable collar 144. A split collar or neck 146 which is clamped to the shaft and located in the grooved end cap 142 provides shoulders to limit the axial movement of the shaft, particularly the downward movement of the shaft into the tank 12.

Since the expandable collar 144 is disposed at the bottom of the passageway defined in the cartridge 126 around the shaft and then upwardly into the confinement region which is closed by the confinement shell 66, substantially the entire confined region in the assembly 120 may be statically sealed.

A purge plate 150 is sandwiched between the flange 68 of the confinement or containment shell and the hub 122 at the upper end thereof. This plate has normally plugged inlet and outlet ports 152 and 154 to which holes 156 and 158 extend. When the plugged port 154 is opened the confined region may be depressurized. The confined region may be purged or sterilized by introducing gas or sterilizing vapors through the inlet port 152 and exhausting the gas or vapors (e.g., nitrogen and/or steam) through the outlet port 154.

The expandable collar 144 is connected via a passage 160 for pressurized air or gas to a control line from a pump (not shown). The bore in the hub in which the cartridge 126 is disposed may have an annular groove or relief 162 which facilitates the insertion and removal of the cartridge 126 and decreases the area of the bore in the hub 122 and the outside of the cartridge 126 which needs to be precisely machined.

FIG. 7 illustrates an assembly 170 with a hub 172 and a cartridge 174 carrying bearings 178 and 180. The bearings 178 and 180 may respectively float downwardly and upwardly on the shaft at their inside races. The outside races of the bearings are both fixed by spacers and snap rings. Passages 184 and 186 bypass the bearings 178 and 180.

The mixer shown in FIG. 7 has a magnet coupling 188 with outer and inner rotors 190 and 192 separated by a confinement shell 194. This coupling may be somewhat different in design from the coupling 26, but is functionally identical therewith. The inner rotor 192 is connected to the shaft 182 by a cap nut 196 which holds the hub of the rotor 192 against a spacer sleeve 198 which acts as a shoulder against the inner race of the bearing 178.

The shaft 182 has a flange 200 which extends radially into a groove defined by the lower surface of a pneumatically pressurized collar 202 and an end cap 204. This groove also captures an expandable elastomeric collar 206 which is normally clear of the flange 200, but when expanded by compressed air which extends to the collar through a line (not shown) defines a seal against the circumferential rim 208 of the flange 200. The flange 200 has a groove which locates an O-ring seal member 210. The gap between the opposed surfaces of the flange 200 and the collar 202 where the O-ring 210 is located is spaced apart sufficiently to prevent a seal from being formed by the O-ring during normal running operation of the shaft. This is because the shaft is biased downwardly by a wave spring 212 (an annular spring member) which is captured between the foot 214 of the confinement shell 194 and the top of the hub 172 and extends radially inward. The bias of this spring is transferred through a ring shaped plate 216 which is bolted to the top of the cartridge 174. The force then is transferred via the lower bearing 180 to the shaft 182 in a downward direction thereby creating the gap of sufficient size to prevent the formation of the seal by the O-ring 210.

When the collar 206 is expanded and a port 218 which extends via a conduit 220 in the hub through the collar 202 is opened, the flange 202, acting as a piston, counteracts the bias of the wave spring 212 and enables the seal to be formed by the O-ring 210. The O-ring therefore provides a double or secondary seal in addition to the expandable collar 206. The flange 200 provides a stop when it engages the end cap 204.

The bypasses around the bearings 178 and 180 assure that the pressure in the confined region is relieved when the port 218 is opened. The port 218 may also be used for purging, sterilizing, etc. when the static seals are in place.

FIGS. 8 and 9 show a mixer system 230 which is similar in design to the embodiment shown in FIG. 7 except that sleeve bearings instead of ball bearings are used. There are upper and lower sleeve or journal bearings 232 and 234 and thrust bearings 238. These thrust bearings are plates on opposite sides of a web 240 or flange which is apperttured, like the journal bearings 232 and 234 at holes 242 and 244 so as to bring all parts of the confined region into communicating relationship. The thrust bearings 238 are pressed into the cartridge 174 and a cap 246 which holds the upper pad of the thrust bearing 238 in place. The wave spring 212 bears against this cap 246 to open the gap where the O-ring 210 is located during normal running operation. When the pneumatically pressurized collar seal is formed by air pressure applied to lines 248 and 250 and the pressure behind the piston 200 is released via the conduit 220 and the plug 218, the spring 212 is further compressed, counteracting its bias by the pressure in the vessel and enabling the seal to be formed by the O-ring 210. The journal and thrust bearings may be of material resistant or inert to the aggressive material being mixed. A sintered graphite material (e.g. Graphalloy) or a polyamidimid (e.g. Vespel) are suitable for this purpose.

FIGS. 10 and 11 show a side entry mixer 260 which enters through the side wall 262 of a tank 264. The side wall has a flange nozzle 266 which forms the opening into the tank. This nozzle is sealed by the assembly 268 including ball bearings 270 and 272 in a cartridge 274 in the bore of a hub 276. The hub is sealless and has an open end which may have a bushing 278. This bushing does not form a seal so that the mixer 268 is sealless as was the case with the mixer system described above.

The mixer 268 has an impeller 280 and an impeller shaft 282 which is journaled in the bearings 270 and 272. The shaft has a flange 284, against the rim of which an expandable collar 286 may be expanded to form a static seal. A double seal is not used in this embodiment of the invention. Pressurized air to the collar 286 is applied via a conduit 288.

The impeller shaft 282 is connected to a gear box 290 containing a gear train in the form of a planetary gear set 292. This gear train as well as the passageway in the cartridge 274 which carries the bearings 270 and 272 are contained in the gear train housing 290.

The gear train is driven by a shaft 294 which is connected to the inner rotor 296 of a magnet coupling 298 by a shaft 300 connected to a motor 302 via an adapter 304. The magnet coupling 298 has an outer rotor 306 which is connected to the shaft 300. The motor 302 is supported on a table 306. The motor front end is mounted on a pedestal 308 which is bolted to a flange 310 which extends radially from the hub 276 of the assembly 268. The flange and pedestal are bolted to the nozzle flange 266.

The planetary gear set 292 has a sun gear 310 which engages planet gears 312 mounted on roller bearings to a planet carrier 314. The planet gears engage a ring gear 315 which is mounted on the housing 290. The output of the planetary gear set 292 is taken at an adapter 316 connected to the upper end of the impeller shaft 282 by one or more splines 320. The planet gear is continuously lubricated by oil in the housing which is circulated by blades 322 on a sleeve 324 connected to the shaft 294 as by a set screw. The oil circulates through ball bearings 326 and 332 which support the shaft 294 against thrust and radial movement and thence through the planet gears 312 and the sun gear to a splash guard 328. There are holes 330 for the circulation of oil backward to another bearing 332, the sleeve 324 and back to the bearing 326 and the planetary gear set 292. The oil may be admitted into the housing 290 via a top plug 334 and drained via a drain plug 336.

Planet gear set 292 provides a reduction in shaft speed and multiplication in torque delivered to the impeller shaft 282. If additional speed reduction and torque multiplication is desired another planetary gear set may be mounted in series and coaxially with the gear set 292 shown in FIG. 11. In the event that the tank 264 contains oil or other lubricating material which does not interact with the oil in the confinement region of the assembly, then it may be desirable to fill the confinement region with oil and to arrange conduits and a piston to equalize the pressure in the confinement region of the assembly 288 with the pressure in the tank thereby preventing leakage into the tank of the oil in the confinement region or leakage of oil from the tank into the confinement region. The planet gear set may be dry running, and the use of such dry running gears may be preferred, especially in the top entry mixer systems, such as shown in FIGS. 1-9.

From the foregoing description it will be apparent that there has been provided improved mixer systems, and especially systems using magnet couplings and sealless entry into a vessel in which mixing occurs. Variations and modifications of the herein described mixer system, in accordance with the invention, will undoubtedly suggest themselves to those skilled in this art. According the foregoing description should be taken as illustrative and not in a limiting sense.

We claim:

1. A seal-less mixer system operable upon aggressive material in a vessel having an opening, which system comprises:
    (a) an impeller;
    (b) a containment region extending from said opening in which said aggressive material is contained;
    (c) a drive shaft having a rotating drive disposed entirely in said containment region, said drive shaft rotatably supporting said impeller;
    (d) an assembly including bearings rotatably supporting said drive shaft in said containment region and exposed to said opening, said assembly closing said opening to confine said aggressive material in said vessel and in said containment region; and
    (e) said containment region including a passageway open to and in communication with said vessel, said passageway connecting said vessel and said bearings in communicating relationship with said aggressive material in said vessel, said bearings having surfaces exposed to said aggressive material which surfaces are of material resistant to said aggressive material.

2. The system according to claim 1 wherein said passageway has opposite ends, one of which is open to said vessel and the other is closed by a confinement member, a coupling having an inner rotor connected to and rotatable with said shaft on the inside of said member in said confinement region, said coupling having an outer rotor on the outside of said member, said inner rotor and said outer rotor being in magnetic coupled relationship with each other through said member, and means for rotatably driving said outer rotor from the outside of said confinement region.

3. The system according to claim 2 further comprising a reduction gear train connected between said inner rotor and said shaft and disposed in said confinement region.

4. The system according to claim 3 wherein said reduction gear train is a planetary gear set having a sun gear connected to said inner rotor and planet gears in a carrier connected to said shaft.

5. The system according to claim 1 further comprising in said assembly around said shaft an expandable collar providing a static seal across said passageway when expanded radially about said shaft when said shaft is stationary.

6. The system according to claim 5 wherein said bearings are spaced axially along said shaft between positions closer to and further away from an end of said passageway which is open to said vessel, and said expandable collar is spaced away from the one of said positions further from said open end of said passageway.

7. The system according to claim 5 wherein said bearings are spaced axially along said shaft between positions closer to and further away from an end of said passageway which is open to said vessel, and said expandable collar is disposed between the one of said positions which is closer to said open end and said open end of said passageway.

8. The system according to claim 5 wherein said passageway has opposite ends one of which is an open end of said passageway and the other of which is closed by a confinement member, drive means for said shaft on opposite sides of said confinement member, a second passageway into said confinement region between said expandable collar and said member to provide access to said confinement region for exhausting, purging or clearing said confinement region when said collar is expanded to provide said seal.

9. The system according to claim 5 wherein said bearings have inner and outer races with rolling elements therebetween, said shaft has a step, a spacer sleeve around said shaft between said inner races of said bearings, and the inner race of at least one of said bearings being fixed between said sleeve and said step.

10. The system according to claim 9 further comprising a second sleeve around said shaft, one of said bearings having its inner race sandwiched and supported in fixed position between said sleeves.

11. The system according to claim 6 wherein said assembly includes a hub having a cylindrical bore defining part of said passageway and through which said shaft extends and along which said bearings are disposed in axially spaced relationship, a collar extending radially inward from said bore and having opposite surfaces respectively facing away from and toward said open end of said passageway, a flange extending radially outward from said shaft and having a rim and opposite side surfaces one opposed to the surface of said collar facing toward said open end of said passageway and the other of the opposite side surfaces of said flange facing the open end of said passageway, a seal member between said opposed surfaces of said flange and said collar, said expandable collar being captured in said hub around said rim, and means for biasing said shaft axially towards said open end of said passageway to normally space said opposed surfaces of said collar and flange away from each other sufficiently to release said seal member from seal forming relationship with said opposed surfaces of said collar and flange, said side surface of said flange facing said open end of said passageway defining a piston for counteracting said bias to enable forming of a seal with said seal member when the pressure in said passageway exposed to said one side surface of said flange is less than the pressure on the side surface of said flange which faces said open end of said passageway.

12. The system according to claim 6 wherein said assembly includes a hub having a cylindrical bore defining part of said passageway and through which said shaft extends, a cylindrical cartridge axially movable in said bore, said bearings being fixed to said cartridge and being axially movable therewith, a shoulder on said shaft facing away from the open end of said passageway on which at least one of said bearings bears, a collar extending radially inward from said bore and having opposite surfaces respectively facing away from and toward said open end of said passageway, said cartridge having opposite ends axially spaced from each other, one of said opposite ends being opposed to the surface of said collar facing away from said open end, a flange extending radially outward from said shaft and having a rim and opposite side surfaces one opposed to the surface of said collar facing toward said open end of said passageway and the other of the opposite side surfaces of said flange facing the open end of said passageway, a seal member between said opposed surfaces of said flange and said collar, said expandable collar being captured in said hub around said rim and means for biasing said cartridge via at least one of said bearings also biasing said shaft axially towards said open end of said passageway to normally space said opposed surfaces of said collar and flange away from each other sufficiently to release said seal member from seal forming relationship with said opposed surfaces of said collar and flange, said side surface of said flange facing said open end of said passageway defining a piston for counteracting said bias to enable forming of a seal with said seal member when said pressure in said passageway exposed to said one side surface of said flange is less than the pressure on said side surface of said flange which faces said open end of said passageway.

13. The system according to claim 11 wherein said biasing means is an annular wave spring captured in said hub and extending radially inward from said bore.

14. The system according to claim 11 wherein said hub defines with said collar an annular groove into which said flange extends, said groove defining a shoulder normally spaced from said side surface of said flange which faces the open end of said passageway for limiting axial movement of said shaft in a direction towards said open end of said passageway.

15. The system according to claim 1 wherein said assembly includes a hub having a cylindrical bore extending axially of said shaft, said hub extending into said vessel, and means assembling said bearings to said bore and to said shaft in said hub.

16. The system according to claim 1 wherein said assembly includes a hub having a cylindrical bore extending axially of said shaft, said bearings being connected to said bore and extending radially to said shaft.

17. The system according to claim 16 wherein said bearings are assembled in a cartridge removably attached to said hub inside said bore.

18. The system according to claim 16 wherein said bearings have inner and outer races with rolling elements therebetween, said outer races being fixed to said bore, and means supporting and assembling said inner races upon said shaft.

19. The system according to claim 1 wherein said passageway has opposite ends one of which is an open end of said passageway and the other of which is closed by a confinement member, drive means for said shaft on opposite sides of said confinement member, a purge plate around said shaft, said purge plate having a second passageway into said confinement region to provide access to said confinement region to exhausting, purging or clearing said confinement region.

20. The system according to claim 1 wherein said bearings are dry running bearings.

21. The system according to claim 20 wherein the said bearings are ball bearings with silicon nitride balls and the races of said bearings have a layer of material, selected from the group consisting of chromium zirconium/zirconium nitride, on the exposed surfaces thereof.

22. The system according to claim 1 wherein said bearings are journal bearings and a thrust bearing spaced from each other and disposed around said shaft.

* * * * *